Reissued Mar. 3, 1931

Re. 17,985

UNITED STATES PATENT OFFICE

JOHN RADCLIFFE, OF SHERLOCK ROW, NEAR TWYFORD, ENGLAND, ASSIGNOR TO COLPROVIA LIMITED, OF LONDON, ENGLAND, A CORPORATION OF GREAT BRITAIN

ROAD MAKING AND THE LIKE

No Drawing. Original No. 1,655,240, dated January 3, 1928, Serial No. 758,265, filed December 26, 1924, and in Great Britain January 2, 1924. Application for reissue filed January 6, 1930. Serial No. 418,979.

This invention relates to roads which are composed of aggregate material bound together with oil-pitch, coal tar pitch and other bitumens and similar materials.

The efficiency of roads requires that they do not unduly soften in summer temperature. The binder should therefore have a melting point high enough to resist too much softening when exposed to the sun. The coated stone should therefore be laid down warm or it will be too stiff to handle. Binders having the requisite temperature stability are well known, but difficult to apply for the reason stated.

My invention consists in a process of road making by which this may be avoided, and at the same time a higher technical efficiency may be arrived at, that is to say, the road may have a good temperature stability in hot and in cold weather, and comprises a method of employing binders by which roads may be either laid down cold or at lower temperatures than hitherto necessary, and at the same time using the desirable higher melting-point binder.

According to one application of my invention, the stone is first coated with a liquid of semi-liquid part of lower melting-point than ultimately required, which need not be done near the road to be made, the resultant mix being of an oily, freely movable nature at temperatures below summer heat. Such a coated stone cannot get wet and perfect coating and perfect adhesion will be secured.

Secondly, at a suitable time before or while this coated stone is being laid down, I add, in any form, but preferably as a dust, a suitable proportion of another binder part of higher melting-point than ultimately required. The resultant mix is composed of aggregate particles coated with a first oily coating and a second exterior dustlike coating of powdered bitumen, the aggregate particles being thus separated from each other by the dustlike coating and therefore freely movable with respect to each other.

This may be done manually or mechanically.

Before the incorporaton of the liquid part or part of too low melting-point which is on the stone, with the part of too high melting-point afterwards added, sufficient time will have elapsed so as to allow of proper handling and placing of the mass in position in consolidation, but the powdered part is preferably applied shortly after the incorporation of the liquid part, as the oiled aggregate if stored for considerable periods of time would be likely to get covered with dust and to oxidize somewhat, thus interfering with proper adhesion thereto of the powdered binder when added. Where powdered binder is promptly added, however, the material can be successfully stored for considerable periods of time and subsequently laid and consolidated by means of pressure.

By rolling and short lapse of time, the binding parts will incorporate and amalgamate to form a composite and consolidated binder of the requisite temperautre stability, the liquid part being a very slow solvent or blending agent for the powdered high melting point part.

The binder dust added may contain fine mineral or organic matter.

I find the mixtures of the kind above described are useful in making or for strengthening roads made from tar and similar materials. Natural mixtures of bitumen and mineral matter have been ground up finely and used for the above purpose.

I find that better and cheaper mixtures can be made containing any required proportion of pitch by grinding together in an impact mill pitch, preferably high melting point oil pitch, for example, that melting at 230° F., and mineral matter, preferably sand. One form of mill suitable for grinding the mixture is of the impact type with rapidly revolving maces which shatter the material while it is suspended in the air.

The finely ground material is or may be removed by a fan. Apparatus which reduces to a fine condition by any form of rubbing is useless for the above purpose, as the effect is simply to roll up or ball up the pitch or bitumen.

A mixture of this kind is not only useful as an enricher, but provides a suitable proportion of "filler", thus avoiding the use of the expensive Portland cement.

The material for the construction of roads by my process can be conveniently prepared in a mixer of the type of a concrete mixer.

The variables are the size of the stone, which determines the viscosity of the liquid, which in turn determines the propertion of the high melting powder and the proportion of total binder. The general principles under which these may be easily determined are as follows:—

The smaller the stone, the more fluid the liquid part should be.

Large stones, of size 1½ inches to 1 inch, rapidly rotated in a mixer, can be easily coated with the requisite amount of liquid or semi-liquid, while smaller material, for example, one-eighth inch, would simply ball up, part of it having too much and part too little. The larger stone would coat without sticking together, which is the correct condition. Sand, on the other hand, requires quite a thin oil, for example, a fuel oil.

The character and quantity of the liquid part determine the proportion of high melting powder to be used. This will be made clear from the example below, which relates to the use together of a fuel oil derived from crude petroleum as a liquid non-volatile flux oil and a high melting-point, e. g. 230° F., residue pitch from distillation.

In the case of fine sand, fuel oil alone may be used for the liquid part. In the case of larger material, part of the solid binder portion would be first dissolved in the fuel oil, thus thickening it. This procedure would facilitate operation of crude oil distillation, as distillation could be carried further, and the more valuable lubrication oils saved, the less valuable high melting-point pitch used for roads, and transported as pitch without packages, which would save money. A ratio of 30 fuel oil of s. gr. 0.95 to 70 of pitch of melting-point 230° F. will in general give a correct binder.

In hot climates, however, the proportion of oil will be less, and in tropical climates, roads without oil can be made if desired, when using finely ground mineral matter with ground pitch, as will afterwards be mentioned. The proportion of ground high melting-point pitch can be greatly increased, and in this case the excess makes and acts as a "filler" with the advantage that rolling will consolidate it. In fact, at a temperature of 70° F., ground pitch of melting-point 230° F. can be mixed with fine mineral matter, and it will consolidate by rolling, although not making as strong a compound for roads as when mixed with a liquid softener.

A ground binder of melting-point 212° F. will, however, give a usable compound with fine mineral matter, such as fine sands.

I have found that a suitable fineness for the ground pitch is such that 60% will pass a mesh of 100 to the linear inch, and 30% a mesh of 200. These figures are obtained with a pitch of 230° F. melting-point, but the process is workable with considerable variations from these figures. In general, if the pitch alone with fine sand will bind in the proportions of 90 sand to 10 pitch, it will be fine enough.

The grinding and handling of the pitch is facilitated by grinding with mineral matter, for example, sand, and this serves a double object, as material fine enough to act as a "filler" can be produced, replacing Portland cement sometimes used. It can also be transported without caking. Thus if a mixture of 90 sand to 10 pitch be passed through a mill of the kind described, it may be ground to the following:—

| | Per cent |
|---|---|
| Passing 20 to linear inch | 1.0 |
| Passing 40 to linear inch | 4.0 |
| Passing 50 to linear inch | 15.0 |
| Passing 70 to linear inch | 27.0 |
| Passing 100 to linear inch | 29.0 |
| Passing 200 to linear inch | 24.0 |

the pitch being relatively more finely ground than the sand.

The binder ratios having been determined according to the principles stated, that is to say, in accordance with the size of the mineral matter, the climatic conditions, the character of the oils available, the character of the pitch available, and the proportion of total binder economically desirable, I use them preferably in the following manner, which may be taken as an example:—

Stone of ¾ to ¼ inch is placed in a mixer, the liquid part added, and the mixer rotated until the said stone is covered, forming an oily mix the aggregate particles of which are freely movable on one another at temperatures below summer heat. The powder part is then added while the mixer rotates and adheres to the liquid coating of the aggregate as a dust. The mixing is continued only long enough to properly distribute the powdered binder throughout the mass forming a freely movable mass of particles cushioned and separated from each other by said dustlike coating. Mixing for longer periods tends to make the mass too sticky and viscous and hinders the removal of the mass from the mixer and the spreading of it on the road. This may be used at once, as the binder course of the road. I prefer, however, to add a proportion of finer mineral matter from one-eighth inch down to sand which has been previously treated with its proportion of liquid part and binder-powder added. This may contain a proportion of sand ground up with pitch. This adheres to the larger mineral matter and aids in forming a separating dustlike cushion between the aggregate particles.

It is better, however, that the stone, large and small, be made to carry its own proportion of the binders. Made in this manner, my road material consists of separate nuclei of stone carrying its binders and surrounded with the proper proportion of finer material also having its binder. This can be transported and rolled down without any more preparation at ordinary or low temperature, and a strong dense road made, as the material for filling the interstices is part of the mass of which the stones form nuclei.

Wearing surfaces composed of the usual fine material, consisting as a rule largely of sand, are made in the same manner. These may contain a total of 11% binder.

Alternatively, the larger stone, after being wetted with liquid part, may have the whole or part of the powder binder added, which has been ground up with mineral matter, as described. This will allow of transport and storage of powder without any danger of caking.

This material may also contain liquid part. The operations may be carried out on the spot, and the mixing done continuously, the pitch dust or pitch dust and ground mineral matter being blown directly by the fan from the mill to the mixer. The material may be prepared in any simple apparatus of the type of a concrete mixer.

In most cases I contemplate mixing and laying at ordinary temperature, but the advantages of the invention are partly realized with mixtures which require a moderate degree of heat, particularly in the case of a thick oil which may require warming to make it run.

As stone may be delivered in a wet condition, I may dry it by adding a proportion of dry lime before adding liquid portion. If moist aggregate has been dried by heating prior to use, it should preferably be cooled before the powdered binder is added.

In this manner I can construct roads without necessarily warming, binders having the desired physical properties can be used without difficulty, efficiencies improved by ensuring the perfect first coating which, by its nature, is not likely to be detached, and a cushion placed, if required, between each stone by increasing the amount of organic or mineral dust added to the pulverized binder part.

I am aware that asphalt pavement is made by mixing powdered bitumen or asphalt with sand or other fine aggregate, then heating the mixture to a relatively high temperature sufficient to make the bitumen or asphalt fluid or at least semi-liquid and then spreading and rolling the mixture on the road while hot. The resulting pavement has the desired density, but it lacks uniformity of distribution of asphalt binder and particles of aggregate, by reason of the fact that the squeezing down of the aggregate particles in the hot, soft asphalt, by rolling, results in squeezing up of the asphalt toward the surface of the road, so that the finished pavement has somewhat less than the desired proportion of binder to aggregate in its lower part and somewhat more than the desired proportion in its upper part and may be covered with a thin skin of asphalt. This makes the road undesirably slippery at first. And wherever the top surface wears through, it permits rapid disintegration of the lower portion of the pavement which has not the desired proportion of binder asphalt.

With my invention, on the contrary, the powdered bitumen or asphalt is still substantially in solid phase when laid. In this condition, it not only has greater specific gravity than when amalgamated with the liquid binder, but the physical state of the dry hard asphalt is such that it cannot squeeze upward to the surface of the road under the pressure of the roller. Hence the distribution of the asphalt through the pavement is better in the case of my process than in the case of the hot asphalt process described. Furthermore, the amalgamation of the liquid and powdered binder under pressure in my process forms a consolidated or composite binder which retains for some time a rather glutinous consistency allowing the particles of aggregate to arrange themselves under the pressure of traffic to positions of ultimate compactness without disturbing the uniformity of relation of aggregates and binder in the pavement and without distortion of the road surface. This feature is of great practical importance, and it is not possible in any type of "hot asphalt" construction because once the pavement has cooled off the asphaltic binder is too hard to permit further movement of the aggregate particles in it.

An additional advantage of my invention over ordinary asphalt roads is by reason of the more perfect distribution of the composite asphaltic binder from top to bottom of the pavement. And as this is composed of correctly proportioned oil and hard asphalt, it has the property of keeping alive the pavement for longer periods than is possible in hot asphalt.

I am also aware that certain asphaltic pavements are laid "cold". The materials for such pavements are prepared by first coating the aggregate with a volatile solvent oil and then mixing in the asphalt at a relatively high temperature (about 270° F.). The volatile solvent oil partially dissolves the asphalt and renders it semi-fluid and workable at ground temperatures so that it may be laid and rolled at the works, provided sufficient time has not elasped to permit evaporation of the solvent. Such cold asphalt pavements are hardened by evaporation of the solvent. But it will be readily understood that the evaporation takes place first at the surface of the pavement, thereby hardening the surface and tending to prevent evaporation from lower portions of the pavement, and thus if a dense upper surface is formed the lower portion remains too soft and the upper surface is permitted to creep and roll, forming undesirable corrugations. To avoid this, such pavements have to be made less dense than is otherwise desirable in order to permit evaporation of the solvent from the whole body of the pavement. Even then undue softness of the lower portion of the pavement is not entirely avoided and the smoothness and wear of such pavements is notably inferior to "hot asphalt" pavements or to those resulting from the use of my invention.

As no evaporation of a volatile solvent is required in laying pavements by my process and pavements so made consolidate at a substantially uniform rate throughout, my invention constitutes a great practical improvement over prior "cold asphalt" pavements of the type described, by permitting uniform distribution of aggregate and binder throughout the pavement while retaining the desired density of the resulting pavement. By my invention, the amount of voids in the finished pavement may be controlled by the selection, sizes and proportions of stone, sand or other aggregate and of the "filler" and binder materials used therewith without sacrificing uniformity of the mixture throughout the pavement. Accordingly, I am enabled to provide a pavement having the desired characteristics of density and to vary the same to the requirements of the pavement to be constructed, whether it be a stone-filled or sand-filled base course or binder course or sheet pavement, while at the same time maintaining uniform distribution of asphalt and aggregate and the desired density throughout these courses.

Difficulty has been encountered heretofore in incorporating into the aggregate material in the finished road the desired proportion of bitumen, when using as a binder hot asphalt alone or asphalt mixed with a liquefier, for in such road building it is found that only a limited amount of bitumen will adhere to the surface of the aggregate particles and be incorporated into the road as laid. This is due to the fact that when the bitumen is sufficiently fluid to be workable in the mixer, most of the bitumen subsequently drains off the surface of the aggregate particles. This difficulty is encountered particularly in coating coarse aggregate material, as coarse material has less surface area in proportion to its bulk than fine material to which the bitumen in fluid condition may adhere. Frequently it is desirable to increase the proportion of bitumen in a road beyond the amount of fluid bitumen which will adhere to the aggregate, to make the road more firmly and permanently bonded. It has been found for example that when hot bitumen used alone or with a liquefier is used in connection with coarse aggregate, the laid road can be made to contain only about 5% bitumen. To make up the deficiency in bitumen, hot bitumen has been heretofore sprayed upon the surface of the laid road but it is obvious that this does not accomplish uniform distribution of the added bitumen.

According to this invention, aggregate may be coated with a flux oil which corresponds in amount to the quantity of hot bitumen, used either alone or with a liquefier, which could have been made to adhere to the aggregate particles by methods heretofore used. Then powdered bitumen may be added to any additional amount desired which adheres as a dust to the aggregate particles and becomes uniformly distributed in the road when laid where it amalgamates with the flux oil to produce a binder of proper consistency. Thus coarse aggregate, for example, may be coated with 5% of flux oil and then an additional 5% or more of powdered bitumen added, thus producing a finished road containing 10% or more of binder uniformly distributed.

In practice, my invention has provided roads which are admirably adapted to heavy traffic and which have a toughness combined with resiliency and long life that make them a substantial improvement over pavements heretofore known.

The invention may be used not only in making the road surface adapted to be laid on existing surfaces of concrete water-bound macadam, tar-spread roads, wornout roads of bituminous materials and the like, but in addition, it may be used for making the foundations as well as the top surface.

While I have described my process particularly in relation to road making, it is apparent that my process is applicable generally to the coating of aggregate materials with a bituminous binder by coating the aggregate with a liquid binder having a melting point lower than is necessary to resist summer heat, applying to the liquid coating of the aggregate a powdered binding having a melting point higher than is necessary to resist summer heat, and amalgamating the said liquid and powdered binders as a composite and consolidated binder for the aggregate having a melting point sufficiently high to resist summer heat by pressing and consolidating the mix without the application of heat.

What I claim and desire to secure by Letters Patent is:—

1. A process of making material for roads wherein stone aggregate is coated with bituminous materials, characterized by coating the aggregate with a slow solvent liquid binder having a melting point lower than is necessary to resist summer heat, and subsequently before or during drying applying to the coated aggregate while relatively cold a powdered bituminous binder having a melting point higher than is necessary to resist summer heat and capable only under applied pressure of amalgamating while cold with the liquid binder to form a substantially homogeneous composite binder.

2. A process of making material for roads wherein stone aggregate is coated with bituminous materials, characterized by coating the aggregate with a slow solvent liquid binder having at a melting point lower than is necessary to resist summer heat, and subsequently before or during drying applying to the coated aggregate while relatively cold a powdered bituminous binder having a melting point higher than is necessary to resist summer heat and capable only under applied pressure of amalgamating while cold with the liquid binder to form a substantially homogeneous composite binder, said latter binder being mixed with a powdered filler.

3. A process of making material for roads, comprising coating aggregate material with a binder which is liquid at temperatures below summer heat to form a freely movable oily mix, and then applying to said aggregate thus coated a powdered bituminous binder having a melting point higher than is necessary to resist summer heat as an adhering exterior dustlike coating for the aggregate particles to form a freely movable mass of particles cushioned and separated from each other by said dustlike coating and adapted to be laid and consolidated in place on roads.

4. A process of making material for roads comprising coating aggregate material with a binder which is liquid at temperatures below summer heat to form a freely movable oily mix, and then applying to said aggregate thus coated a powdered bituminous binder having a melting point higher than is necessary to resist summer heat and a powdered mineral substance as an adhering exterior dustlike coating for the aggregate particles to form a freely movable mass of particles cushioned and separated from each other by said dustlike coating and adapted to be laid and consolidated in place on roads.

5. A process of making roads wherein aggregate material coated with a bituminous binder having a melting point sufficiently high to resist summer heat is used, characterized by coating the aggregate with a slow solvent liquid binder having a melting point lower than is necessary to resist summer heat to form an oily mix the particles of which are freely movable on one another at temperatures below summer heat, applying to said liquid coating of the aggregate as an adhering dust a powdered binder having a melting point higher than is necessary to resist summer heat, and capable only under applied pressure of amalgamating while cold with the liquid binder to form a substantially homogenous composite binder, and thereafter substantially amalgamating said liquid and powdered binders as a composite consolidated binder for the aggregate by means of pressure and consolidation of the mass while in place without the application of heat.

6. Process of road making which comprises first preparing the pavement material by drying the aggregate, mixing a filler with the dried aggregate, coating the aggregate and filler with a substantially non-volatile oil which is liquid at temperatures below summer heat, and coating the oiled aggregate and filler with a powdered hard asphalt at normal temperature.

7. Process of road making which comprises first preparing the pavement material by drying the aggregate, mixing a filler with the dried aggregate, coating the aggregate and filler with a substantially non-volatile oil, which is liquid at temperatures below summer heat, coating the oiled aggregate and filler with a powdered hard asphalt at normal temperature, and then laying the pavement material so prepared and amalgamating the oil and powdered hard asphalt by pressure and rolling to form a composite binder having a melting point sufficiently high to resist summer heat, substantially uniformly distributed with the aggregate throughout the resulting pavement.

8. A process of making roads wherein aggregate material is coated with a bituminous binder having a melting point sufficiently high to resist summer heat, characterized by coating the aggregate with a substantially non-volatile binder which is liquid at temperatures below summer heat, applying to said liquid coating of the aggregate as an adhering dust a powdered bituminous binder having a melting point higher than is necessary to resist summer heat, laying the aggregate as thus coated with said liquid binder and with said adhering powdered binder, and substantially amalgamating the liquid and powdered binders by rolling and consolidating the material in place without the application of heat.

9. A process of coating aggregate material with a bituminous binder, characterized by coating the aggregate with a binder which is liquid at temperatures below summer heat to form a freely movable oily mix applying to the liquid coating of the aggregate a powdered binder having a melting point higher than is necessary to resist summer heat, and amalgamating said liquid and powdered binders as a composite and consolidated binder for the aggregate having a melting point sufficiently high to resist summer heat by pressure and consolidation of the mix without the application of heat.

10. A process of road making wherein aggregate material is coated with a bituminous binder having a melting point sufficiently high to resist summer heat, comprising coating the aggregate at a temperature below summer heat with a non-volatile liquid oily binder to form a freely-movable oily mix, applying to said aggregrate thus coated at a temperature not above summer heat a powdered bituminous binder having a melting point higher than is necessary to resist summer heat as an adhering exterior dustlike coating for the aggregate particles to form a freely-movable mass of particles cushioned and separated from each other by said dustlike coating, laying the aggregate unheated as thus coated with said liquid binder coating and with said powdered binder coating, and substantially amalgamating the liquid and powdered binders by consolidating the material in place without the application of heat.

11. A process of coating aggregate material with a bituminous binder, comprising coating the aggregate with a binder which is liquid at temperatures below summer heat to form a freely movable oily mix, applying to the aggregate thus coated at a temperature not above summer heat a powdered binder having a melting point higher than is necessary to resist summer heat as an adhering exterior dustlike coating for the aggregate particles to form a freely movable mass of particles cushioned and separated from each other by said dustlike coating, and then amalgamating said liquid and said powdered coatings by means of pressure and consolidation of the mix without the application of heat to form a composite and consolidated binder for the aggregate having a melting point sufficiently high to resist summer heat.

In testimony whereof, I affix my signature.

JOHN RADCLIFFE.

CERTIFICATE OF CORRECTION.

Reissue Patent No. 17,985. Granted March 3, 1931, to

JOHN RADCLIFFE.

It is hereby certified that error appears in the printed specification of the above numbered patent requiring correction as follows: Page 1, line 70, for "temperautre" read temperature; page 4, line 106, after "surface" insert "Moreover, my invention is also adapted to the making of paving blocks composed of aggregate coated and bound together by bitumen, simply by taking aggregate material coated with a first coating of flux oil and a second adhering dustlike coating of powdered bitumen and pressing said material into suitable forms, thus consolidating and amalgamating the binders and forming blocks of desired shapes and dimensions.

Page 4, line 115, for "binding" read binder, and page 5, line 14, claim 2, strike out the word "at"; and that the said Letters Patent should be read with these corrections therein that the same may conform to the record of the case in the Patent Office.

Signed and sealed this 14th day of April, A. D. 1931.

M. J. Moore,
Acting Commissioner of Patents.

(Seal)